United States Patent
Somes et al.

(10) Patent No.: US 7,424,106 B2
(45) Date of Patent: Sep. 9, 2008

(54) ROUTING TRAFFIC BETWEEN CARRIERS

(75) Inventors: Brian E. Somes, Garland, TX (US); Kimberly A. Galdiano, Allen, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 221 days.

(21) Appl. No.: 11/315,097

(22) Filed: Dec. 23, 2005

(65) Prior Publication Data

US 2007/0147598 A1    Jun. 28, 2007

(51) Int. Cl.
*H04M 7/00* (2006.01)

(52) U.S. Cl. ............ 379/221.02; 379/219; 379/220.01; 379/221.01; 379/221.02; 379/88.17; 370/352; 370/353; 370/354; 370/355; 370/356

(58) Field of Classification Search ............ 379/220.01, 379/220.02, 219, 221.01, 221.02; 370/352, 370/353, 354, 355, 356
See application file for complete search history.

(56) References Cited

U.S. PATENT DOCUMENTS

| 6,324,277 | B1 * | 11/2001 | Akinpelu et al. | ....... 379/221.02 |
| 2003/0123632 | A1 * | 7/2003 | Smith | .................... 379/220.01 |
| 2006/0236388 | A1 * | 10/2006 | Ying et al. | .................... 726/15 |

* cited by examiner

*Primary Examiner*—Fan Tsang
*Assistant Examiner*—Simon King

(57) ABSTRACT

A method for routing an international call includes receiving a call and identifying a first international carrier based on an Internet protocol address associated with the call or a tunnel through which the call was received. The method also includes identifying a second international carrier based on the identified first international carrier. The second international carrier may represent a terminating carrier associated with forwarding the call to a called party. The method may further include forwarding the call to the identified second international carrier.

22 Claims, 4 Drawing Sheets

| INITIATING CARRIER 310 | DESTINATION COUNTRY 320 | TERMINATING CARRIER 330 | OTHER 340 |
|---|---|---|---|
| BRITISH TELECOM | CHINA | CHINA UNICOM | YES |
|  |  |  |  |
|  |  |  |  |
|  |  |  |  |
|  |  |  |  |

FIG. 3

ROUTING TRAFFIC BETWEEN CARRIERS

FIELD OF THE INVENTION

The invention relates generally to telecommunications and, more particularly, to providing connections between carriers.

BACKGROUND OF THE INVENTION

International telecommunication carriers often wish to connect to other specific international telecommunication carriers for which they have no direct connections. Currently, such carriers may use an international transit network to connect with each other. For example, an international carrier may forward an international call to the transit network. The transit network then performs the routing required to forward the international call to a destination carrier.

One problem with routing calls in this manner involves the international transit network. For example, the international transit network provider must be able to provide interfaces associated with routing calls to a large number of international carriers. This typically involves routing the calls via customized interfaces associated with various international carriers. Using customized interfaces makes it much more difficult and costly for a transit network provider to connect various international carriers to other international carriers.

SUMMARY OF THE INVENTION

According to one aspect of the invention, a method for routing an international call is provided. The method includes receiving a call and identifying a first international carrier based on an Internet protocol address associated with the call or a tunnel via which the call was received. The method also includes identifying a second international carrier based on the identified first international carrier, where the second international carrier represents a terminating carrier associated with forwarding the call to a called party. The method further includes forwarding the call to the identified second international carrier.

According to another aspect of the invention, a network device that includes a memory and logic is provided. The memory is configured to store information identifying destination carrier information. The logic is configured to receive Internet protocol (IP) based calls and time division multiplexed (TDM) based calls. The logic is also configured to identify an initiating carrier associated with a first call based on an IP address associated with the first call or a tunnel through which the first call was received and identify a destination carrier associated with the first call based on the identified initiating carrier and information stored in the memory. The logic is further configured to forward the call to the identified destination carrier.

In still another aspect of the invention, a method for routing calls from a first international carrier to a second international carrier is provided in a network device. The method includes receiving a first call and identifying the first international carrier based on an Internet protocol address associated with the first call or a tunnel through which the first call was received. The method also includes accessing a database to identify a second international carrier based on the identified first international carrier, where the second international carrier represents a terminating carrier associated with forwarding the first call to a called party, and forwarding the first call to the identified second international carrier. The method further includes receiving a second call from the first international carrier and identifying a forwarding network device associated with the second call based on a link or network from which the second call was received or information included with the second call. The method also includes forwarding the second call to the identified forwarding network device.

Other features and advantages of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

FIG. 3 illustrates an exemplary database that may be used in an implementation consistent with the invention.

DETAILED DESCRIPTION

Figure 1:
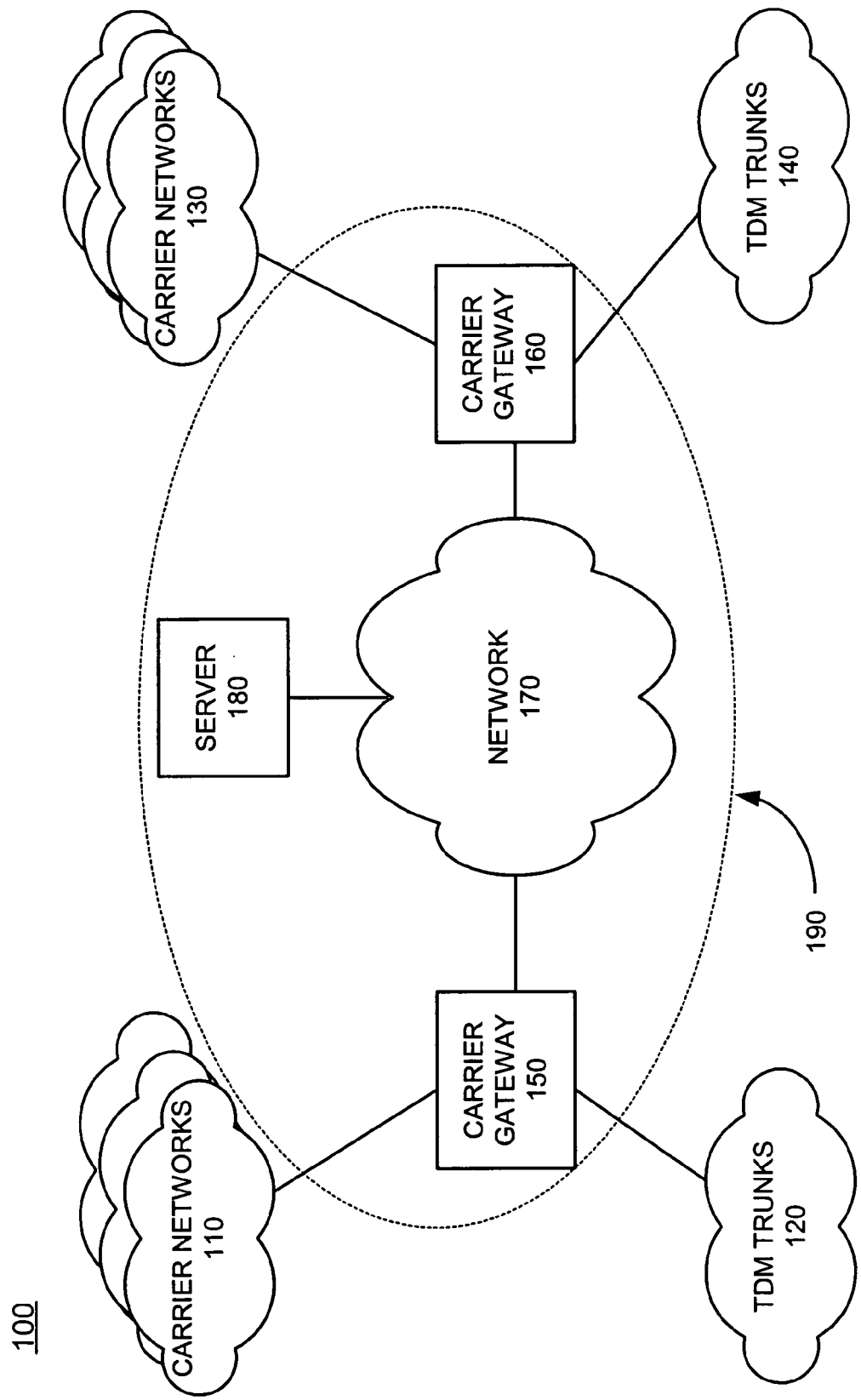
FIG. 1 is a diagram of an exemplary system in which methods and systems consistent with the invention may be implemented.

FIG. 1 is a block diagram of an exemplary system 100 in which methods and systems consistent with the invention may be implemented. System 100 may include carrier networks 110, time division multiplexed (TDM) trunks 120, carrier networks 130, TDM trunks 140, carrier gateways 150 and 160, network 170 and server 180. The exemplary configuration illustrated in FIG. 1 is provided for simplicity. It should be understood that a typical system may include more or fewer elements than illustrated in FIG. 1. For example, additional gateways, routers, switches, etc., involved in routing traffic between carriers may be included in system 100.

Carrier networks 110 may include one or more packet switched networks, such as an Internet protocol (IP) based network, that routes telecommunications traffic (e.g., voice over IP (VOIP) traffic). For example, carrier networks 110 may include one or more session initiation protocol (SIP) based networks, one or more H.323/H.225-based networks, or any other type of packet switched network that is capable of transmitting traffic from a source device to a destination device. In an exemplary implementation, carrier networks 110 may be associated with one or more national or international carriers.

Carrier networks 130 may include one or more similar packet switched networks as carrier networks 110. For example, carrier networks 130 may include one or more IP-based networks, such as a SIP-based network, an H.323/H.225-based network, etc.

TDM trunks 120 may represent TDM-based links or connections associated with one or more national or international carriers. For example, TDM trunks 120 may include trunks or connections from international carriers/networks that communicate with one or more terminating international carriers using TDM protocols, such as the integrated services digital network user part (ISUP) protocol, telephone user part (TUP) protocol, etc.

TDM trunks 140 may include trunks or connections similar to TDM trunks 120. For example, TDM trunks 140 may include trunks or connections from international carriers/networks that communicate using TDM protocols, such as ISUP, TUP, etc.

Carrier gateway 150 may include one or more devices that receives IP-based traffic and TDM-based traffic and allows divergent transport networks to communicate and cooperatively carry traffic. For example, transit gateway 150 may provide for interoperation between networks using, for example, IP-based protocols (e.g., SIP, H.323/H.225, etc.) and networks using TDM protocols. Carrier gateway 150 may also determine routing information associated with routing telecommunication traffic from one national/international carrier to another national/international carrier, as described in more detail below.

Carrier gateway 160 may include one or more similar devices as carrier gateway 150. That is, carrier gateway 160 may receive and/or transmit traffic using IP-based protocols, such as SIP, H.323/H.225-based protocols, etc., as well as receive and/or transmit traffic using TDM-based protocols.

Network 170 may include one or more networks, such as a public network (e.g., the Internet, one or more pubic switched telephone networks, etc.), that is able to carry data between carriers. In an exemplary implementation, network 170 may be used to route traffic between an originating international carrier and a terminating international carrier, as described in more detail below.

Server 180 may include a server, such as a proxy server, routing server, etc., that is able to provide routing instructions and/or applications associated with transmitting traffic between international carriers. Server 180 is shown as a single device that is not part of network 170. It should be understood that server 180 may include more than one device and may be implemented in network 170.

In an exemplary implementation, a transit network provider may be associated with a number of the elements illustrated in system 100. For example, the elements shown inside the dashed oval in FIG. 1, referred to herein as transit network 190, may be associated with a transit network provider that provides for routing traffic between international carriers, as described in more detail below. The transit network provider may control and/or own one or more of the elements in transit network 190 to facilitate routing traffic between carriers.

Figure 2:
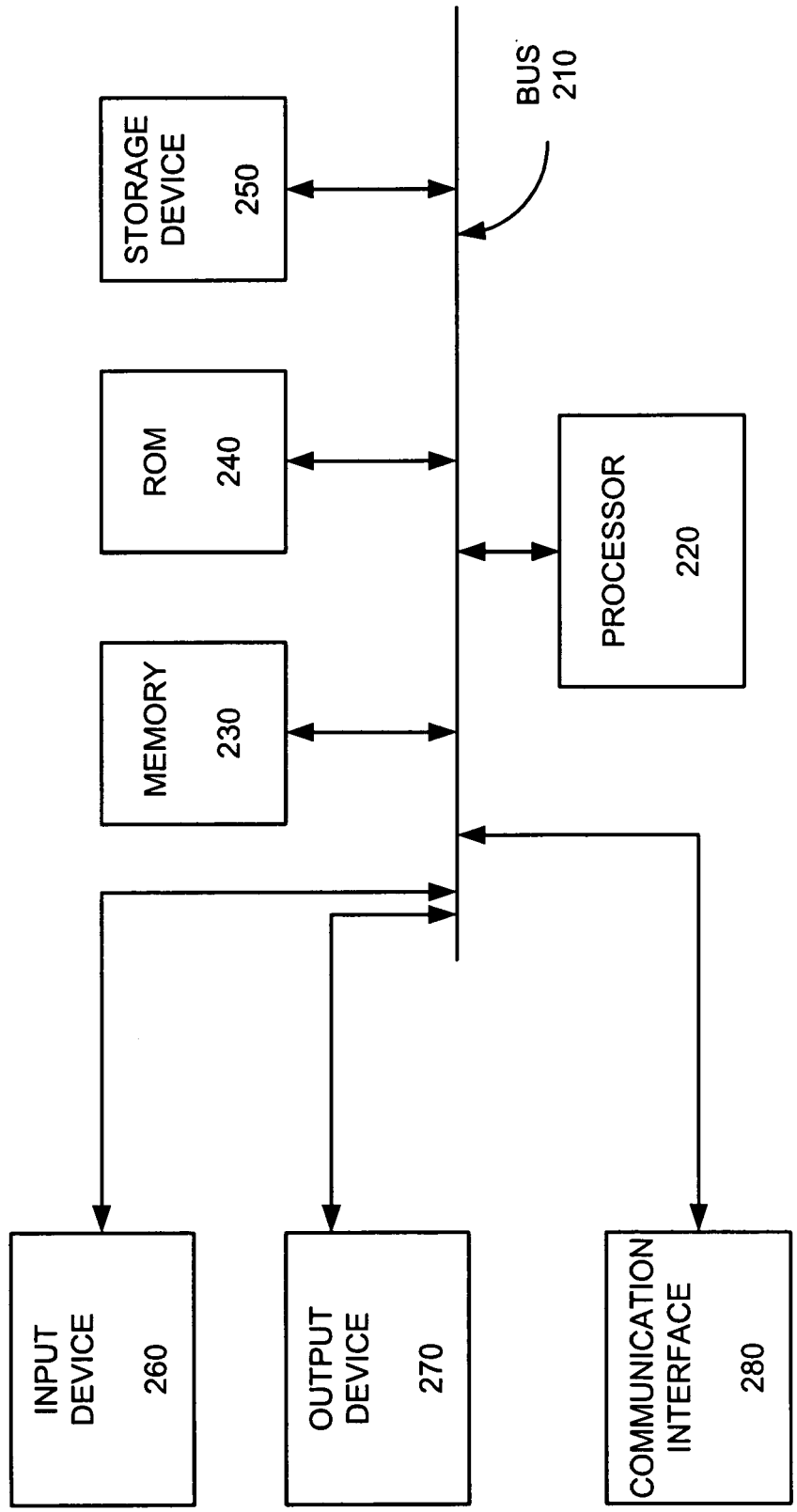
FIG. 2 is an exemplary block diagram of a carrier gateway and/or a server of FIG. 1.

FIG. 2 illustrates an exemplary configuration of carrier gateway 150 in an implementation consistent with the invention. Carrier gateway 160 and/or server 180 may be configured in a similar manner. It should be understood that other configurations may alternatively be used. Carrier gateway 150 may include bus 210, processor 220, memory 230, read only memory (ROM) 240, storage device 250, input device 260, output device 270, and communication interface 280. Bus 210 permits communication among the components of carrier gateway 150.

Processor 220 may include any type of processor, microprocessor or processing logic that interprets and executes instructions. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions.

Input device 260 may include one or more mechanisms that permit an operator to input information to carrier gateway 150, such as a keyboard, a mouse, a pen, voice recognition and/or biometric mechanisms, etc. Output device 270 may include one or more mechanisms that output information to the operator, including a display, a printer, one or more speakers, etc. Communication interface 280 may include any transceiver-like mechanism that enables carrier gateway 150 to communicate with other devices and/or systems. For example, communication interface 280 may include mechanisms for communicating via a network, such as carrier networks 110 and network 170, as well as communicate with TDM trunks 120. Communication interface 280 may also include a modem or an Ethernet interface to a LAN.

Carrier gateway 150, consistent with the invention, provides a platform through which carrier traffic from, for example, carrier networks 110 and TDM trunks 120, may be forwarded to a terminating international carrier. According to an exemplary implementation, carrier gateway 150 may perform various processes in response to processor 220 executing sequences of instructions contained in memory 230. Such instructions may be read into memory 230 from another computer-readable medium, such as storage device 250, or from a separate device via communication interface 280. It should be understood that a computer-readable medium may include one or more memory devices or carrier waves. Execution of the sequences of instructions contained in memory 230 may cause processor 220 to perform the acts that will be described hereafter. In alternative embodiments, hard-wired circuitry may be used in place of or in combination with software instructions to implement features of the invention. Thus, implementations consistent with principles of the invention are not limited to any specific combination of hardware circuitry and software.

FIG. 3 illustrates an exemplary database 300 that may be used in implementations consistent with the invention. In an exemplary implementation, database 300 may be stored in carrier gateway 150, such as in storage device 250 (FIG. 2). Alternatively, database 300 may be located externally from carrier gateway 150, but accessible by carrier gateway 150. In still other alternatives, database 300 may be located in, for example, server 180.

Referring to FIG. 3, database 300 may include an initiating carrier field 310, a destination country field 320, a terminating carrier field 330 and other field 340. Initiating carrier field 310 may include an identifier that uniquely identifies a particular national/international carrier. Destination country field 320 may identify a destination country for international traffic. Terminating carrier field 330 may also include an identifier that uniquely identifies a particular carrier, such as a terminating international carrier to whom traffic is to be routed for an international call. Other field 340 may identify other parameters associated with routing calls, such as whether the information stored in fields 310-330 is to be used for routing calls, special routing instructions, quality parameters associated with calls, etc.

Database 300 may be used to indicate how international calls should be routed. For example, referring to entry 302 in FIG. 3, field 310 includes an identifier that corresponds to British Telecom, field 320 identifies China as the destination country and field 330 includes an identifier that corresponds to China Unicom. In this case, traffic from British Telecom that is destined for China should be routed to China Unicom. This information may indicate that British Telecom has contracted with China Unicom to route calls from British Telecom that are destined for China.

Other field 340, as described above, may identify parameters associated with routing calls between the initiating and terminating carriers identified in fields 310 and 330, such as special routing instructions, quality parameters associated with calls, etc. In addition, in some implementations, other field 340 may indicate whether calls should be routed according to information in database 300 or whether the information in database 300 should be ignored in favor of information included with the calls. For example, other field 340 in entry 302 may store a Yes (or a 1) that indicates that the information in fields 310-330 in entry 302 should be used to route calls between the initiating and terminating carriers. Alternatively, if a No (or a 0) is stored in other field 340, this may indicate that the information stored in fields 310-330 for entry 302 is to be ignored when routing traffic. In this case, traffic may be routed based on parameters included with the received traffic or based on trunks/links on which the traffic was received.

In an exemplary implementation, the information stored in database 300 may be provided by an initiating carrier to a transit network provider associated with transit network 190. For example, initiating carriers that do not have direct connections to various terminating carriers may contract with a transit network provider to carry international traffic. In this case, each initiating carrier may provide information to the transit network provider that identifies the desired terminating carriers. The transit network provider may then store this information in database 300 for later use when routing traffic between the international carriers.

EXEMPLARY PROCESSING

Figure 4:
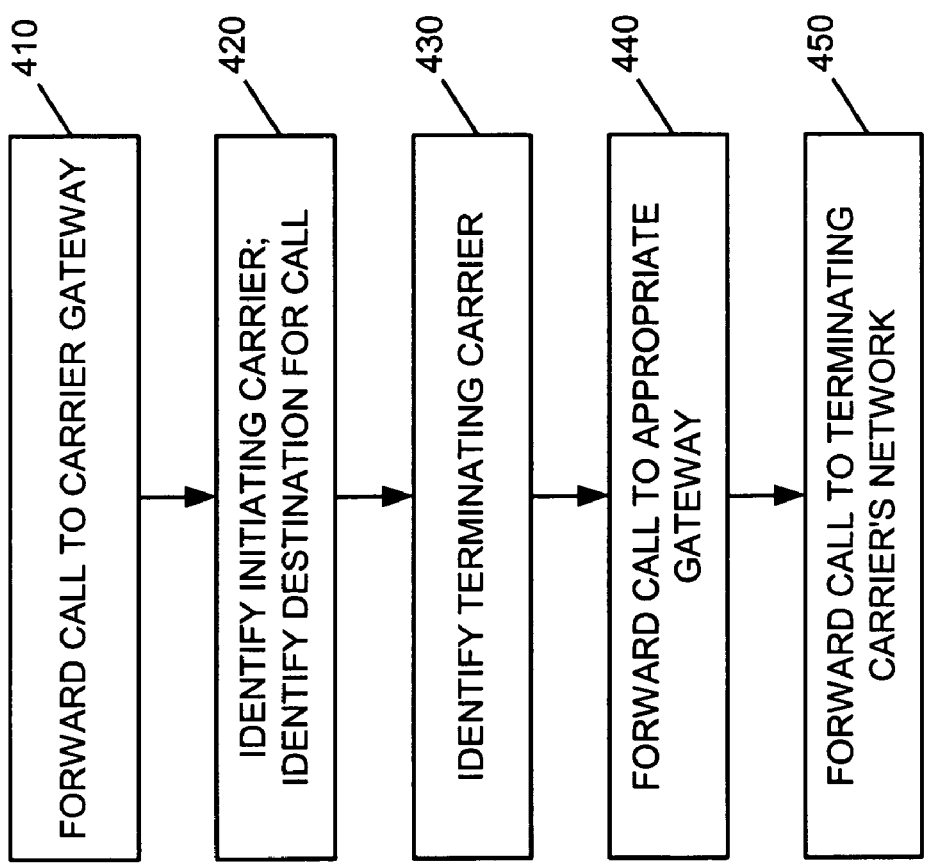
FIG. 4 illustrates exemplary processing associated with forwarding a call from one carrier to another carrier, consistent with the invention.

FIG. 4 is an exemplary flow diagram, consistent with the invention, illustrating processing associated with forwarding traffic from an originating carrier to a terminating carrier. Processing may begin when one of carrier networks 110 forwards a call to carrier gateway 150 (act 410). The call may be an international call from an initiating international carrier that has no direct connections with a carrier to whom the call will be terminated.

Carrier gateway 150 receives the call. Carrier gateway 150 may then identify the initiating carrier associated with the call (act 420). For example, if the call is an IP-based call (e.g., a SIP-based call or an H.323/H.225-based call), the call may include an IP address as part of the standard information included in the call. In this case, the IP address may be used to identify the initiating carrier. That is, carrier gateway 150 may store information that identifies an initiating carrier based on the IP address.

Alternatively, carrier gateway 150 may identify the initiating carrier based on a particular IP network from which the call was received (e.g., one of carrier networks 110) or an IP Security (IPSec) tunnel through which the call is received. For example, carrier gateway 150 may determine that one or more particular IPSec tunnels via which IP calls are received is associated with a particular initiating carrier. Carrier gateway 150 may then use this information to identify the initiating carrier associated with the call.

In each case, carrier gateway 150 may identify the initiating carrier. Carrier gateway 150 may also identify a destination for the call, such as a destination country, based on, for example, the called telephone number (act 420). For example, the called telephone number may be in an E. 164 format which includes a country code. In this case, carrier gateway 150 may identify the destination country based on the unique country code.

Carrier gateway 150 may also identify the appropriate terminating carrier (act 430). For example, carrier gateway 150 may access database 300 (located either locally on carrier gateway 150 or remotely) and identify the terminating carrier in field 330 that corresponds to the identified initiating carrier and identified destination country. For example, if the initiating carrier identified in act 420 was British Telecom and the destination country was identified as China, carrier gateway 150 may search database 300 for the British Telecom and China in fields 310 and 320. Carrier gateway 150 may then identify the appropriate terminating carrier in field 330. In the example, in FIG. 3, carrier gateway 150 would identify China Unicom as the appropriate terminating carrier for calls from British Telecom that are destined for China.

Carrier gateway 150 may then forward the call to another gateway that is connected to China Unicom's network. For example, if carrier gateway 150 does not have a direct connection with China Unicom's network, carrier gateway 150 identifies an appropriate gateway connected to China Unicom's carrier network. For example, assume that carrier gateway 160 is connected to China Unicom's carrier network 130. In this case carrier gateway 150 forwards the call to carrier gateway 160 via network 170.

In another implementation in which database 300 is not stored in carrier gateway 150 or is not accessible by carrier gateway 150, carrier gateway 150 may forward the call and/or information associated with the call to an intelligent network device that determines the appropriate terminating carrier for carrier gateway 150. For example, in this implementation, carrier gateway 150 may forward the call information to server 180. Server 180 may then access database 300, either locally at server 180 or remotely, to determine the appropriate terminating carrier. Server 180 may then forward the terminating carrier information and/or the forwarding gateway information to carrier gateway 150.

In each case, assume that carrier gateway 160 is identified as being coupled to the appropriate terminating carrier. Carrier gateway 150 may then forward the call to the identified carrier gateway (act 440). Carrier gateway 160 may then route the call to the terminating carrier's network, such as one of carrier networks 130 (act 450). The terminating carrier's network will then route the call to the ultimate destination (i.e., the called party).

In this manner, transit network providers may leverage information associated with received IP-based calls to identify the appropriate terminating carrier. That is, transit network providers may use information that is normally used for routing domestic calls to identify a destination international carrier. This enables international calls to be handled without the need for costly, non-standard interfaces that are difficult to implement and/or maintain.

As discussed previously, in some implementations, information regarding terminating carriers stored in database 300 may be ignored. In such implementations, information included with a received call may include a desired destination carrier. For example, in some implementations, such as for a SIP-based call, the call from the initiating carrier may include a carrier identification code (CIC) or some other unique identifier that identifies the desired terminating carrier. The CIC may be a numeric code assigned by the North American Numbering Plan (NANP) Administrator that is unique for each national/international carrier. The CIC is normally used for routing domestic calls. In this situation, the CIC may identify a desired destination international carrier to whom the originating carrier would like the call to be forwarded. If the call is an H.323/H.225-based call, the call may include a "carrierinfo" field that identifies a desired destination carrier in a similar manner as the CIC field for a SIP-based call. Alternatively, the call may include another unique code that is used within a transit network (e.g., transit network 190) for identifying a desired destination carrier.

In each case, if the call includes information identifying a desired destination carrier, carrier gateway 150 may access database 300 and determine if the information in other field 340 indicates "No" (or 0). As discussed previously, a No (or 0) in other field 340 may indicate that the terminating carrier information stored in field 330 for that particular initiating carrier may be ignored and the received call may be routed to a destination carrier based on destination carrier information included with the received call. Using other field 340 in database 340 enables a transit network provider to selectively determine how to route received calls.

For example, the transit network provider may selectively set a mode associated with routing calls from one or more international carriers by setting other field 340 to the desired value. In other words, if the transit network provider sets other field 340 to Yes (or 1) in entry 302, this indicates that destination carrier information received with a call from British Telecom that is destined for China is to be ignored and that China Unicom will be the destination carrier. If, however, the transit network provider sets other field 340 to No (or 0), this indicates that destination routing information included with a received call should be used to identify the appropriate destination carrier, thereby overriding the information stored in field 330. This may help ensure that previously agreed routing instructions between parties are followed, but also allows the transit network provider to easily change routing instructions based on, for example, new agreements made between international carriers.

In other implementations, a carrier gateway, such as carrier gateway 150, may be configured to always use received destination information identifying a particular destination carrier to route the call to the desired destination carrier, regardless of the information stored in field 340. In these cases, the received destination carrier information will always override information stored in database 300.

System 100, consistent with the invention, may also be used to handle calls from TDM trunks. For example, referring to FIG. 1, calls received on TDM trunks 120 may be received by carrier gateway 150. Carrier gateway 150 may identify the appropriate destination carrier based on, for example, a trunk on which the call was received, destination information included in the received call, forwarding information stored in carrier gateway 150, etc. Carrier gateway 150 may then route the call to another carrier gateway that handles TDM calls. For example, carrier gateway 150 may forward the call to carrier gateway 160 via network 170. Carrier gateway 160 may then forward the call to an appropriate one of TDM trunks 140. In this manner, carrier gateways, such as carrier gateways 150 and 160 may handle both IP-based calls and TDM-based calls.

In some implementations, if carrier gateway 150 receives no carrier identification information with a received call (i.e., the call is received on one of TDM trunks 120 or the call is an IP call with no CIC/carrierinfo), carrier gateway 150, as discussed above, may determine a destination carrier based on the particular carrier network on which the call is received (e.g., one of carrier networks 110), an IPSec tunnel via which the call was received, an IP address included with the call or based on the link on which the call is received (e.g., one of TDM links 120). If carrier gateway 150 does not have a connection to the desired terminating carrier gateway, carrier gateway 150 may convert the received call to a SIP call with a CIC, such that the call can be forwarded to a carrier gateway represented by the CIC code. In this manner, calls may be modified, if necessary, to route the calls to the appropriate destination carrier.

CONCLUSION

Systems and methods described herein facilitate communications between international carriers. Systems and methods described herein also provide increased flexibility by using standard fields typically used for other purposes to identify the appropriate destination international carrier for a call. This provides a simplified approach to routing both IP and TDM based calls through a transit network, as opposed to using specialized customized interfaces for each carrier.

In this disclosure, there is shown and described preferred embodiments of the invention, but, as aforementioned, it is to be understood that the invention is capable of use in various other combinations and environments and is capable of changes or modifications within the scope of the inventive concept as expressed herein.

For example, the implementations described above focus mainly on a gateway being used to identify an appropriate destination gateway. It should be understood that in other implementations, other network devices, such as proxy servers, general servers, routers, switches, etc., or a combination of these network devices, may be used to identify destination carrier information.

In addition, as described above, database 300 is described above as including initiating carrier, destination country and terminating carrier fields 310-330. In some implementations, an originating carrier's traffic destined for a particular country may be split among a number of destination carriers. In this case, the dialed number may be used to identify a particular destination carrier. For example, an area code field may be included in database 300 to facilitate the routing of the calls to the appropriate destination carrier.

It should also be understood that additional information, such as particular requirements associated with a received call, may be used to identify a particular destination carrier. In this case, database 300 may include additional fields associated with received calls and/or requirements associated with received calls, to facilitate identifying the appropriate destination carrier to whom the calls are to be routed.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

Lastly, a series of acts has been described with respect to FIG. 4, the order of the acts may be varied in other implementations consistent with the present invention. Moreover, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A method for routing an international call, comprising:
   receiving a call;
   identifying a first international carrier based on an Internet protocol (IP) address associated with the call or a tunnel via which the call was received;
   identifying a second international carrier based on the identified first international carrier, the second international carrier representing a terminating carrier associated with forwarding the call to a called party, wherein the identifying a second international carrier includes:
      accessing a table storing information identifying a plurality of originating international carriers and a corresponding terminating international carrier for each of the plurality of originating international carriers, and
      identifying the second international carrier from the table based on the identified first international carrier; and
   forwarding the call to the identified second international carrier.

2. The method of claim 1, wherein the identifying a second international carrier further comprises:
   identifying a destination country associated with the call based on destination country information included with the call,
   accessing the table to identify a first entry comprising information including the identified first international carrier and the identified destination country, and
   identifying the second international carrier in the first entry.

3. The method of claim 1, wherein the call comprises a voice over Internet protocol based call.

4. The method of claim 3, wherein the call comprises a session initiation protocol based call.

5. The method of claim 3, wherein the call comprises an H.323/H.225-based call.

6. The method of claim 1, wherein the identifying a second international carrier further comprises:
   forwarding information associated with the call to a network device, where the network device is configured to identify at least one of the second international carrier or a gateway coupled to the second international carrier.

7. The method of claim 1, wherein the forwarding comprises:
   forwarding the call to a destination gateway connected to the second international carrier.

8. The method of claim 1, wherein the receiving a call comprises:
   receiving the call by a network device, the method further comprising:
   configuring the network device to ignore destination carrier information included with the call.

9. A network device, comprising:
   a memory configured to store:
      information identifying a plurality of initiating carriers,
      information identifying destination countries, and
      information identifying a destination carrier corresponding to each initiating carrier and destination country pair, wherein the plurality of initiating carriers represent international carriers and the plurality of destination carriers represent international carriers; and
   logic configured to:
      receive Internet protocol (IP) based calls and time division multiplexed (TDM) based calls,
      identify an initiating carrier associated with a first call based on an IP address associated with the first call or a tunnel through which the first call was received,
      identify a destination carrier associated with the first call based on the identified initiating carrier and information stored in the memory, and
      forward the call to the identified destination carrier.

10. The network device of claim 9, wherein the logic is further configured to:
    identify an initiating carrier associated with a second call based on an incoming trunk on which the call was received.

11. The network device of claim 9, wherein the first call comprises a session initiation protocol based call.

12. The network device of claim 9, wherein the first call comprises an H.323/H.225-based call.

13. The network device of claim 9, wherein the logic is further configured to:
    identify a destination gateway connected to the identified destination carrier, and
    forward the received call to the identified destination gateway.

14. The network device of claim 9, wherein the logic is further configured to:
    ignore information identifying a destination carrier included with received calls based on information stored in the memory.

15. The network device of claim 9, wherein the logic is further configured to:
    determine whether to identify a destination carrier using information stored in the memory based on a configuration setting associated with the network device.

16. A system, comprising:
    means for storing information identifying a plurality of initiating international carriers and a plurality of terminating international carriers corresponding to the plurality of initiating international carriers;
    means for receiving an Internet protocol (IP) based call from a first international carrier;
    means for identifying a second international carrier, using the stored information, based on an IP address associated with the call or a tunnel through which the call was received, the second international carrier representing a terminating carrier associated with forwarding the call to a called party; and
    means for forwarding the call to the identified second international carrier.

17. The system of claim 16, further comprising:
    means for receiving time division multiplexed (TDM) based calls; and
    means for forwarding the TDM-based calls based on trunk information associated with the received TDM based calls.

18. The system of claim 16, further comprising:
    means for determining whether to use information identifying a destination carrier included with a first IP based call to identify a destination carrier for the first IP based calls.

19. In a network device, a method for routing calls from a first international carrier to a second international carrier, comprising:

receiving a first call;

identifying the first international carrier based on an Internet protocol address associated with the first call or a tunnel through which the first call was received;

accessing a database to identify the second international carrier based on the identified first international carrier, the second international carrier representing a terminating carrier associated with forwarding the first call to a called party, wherein the database comprises information identifying a plurality of originating international carriers, a plurality of destination countries and a terminating international carrier for each originating international carrier and destination country pair, wherein the first international carrier comprises an originating international carrier and the second international carrier comprises a terminating international carrier;

forwarding the first call to the identified second international carrier;

receiving a second call from the first international carrier;

identifying a forwarding network device associated with the second call based on a link or network from which the second call was received or information included with the second call; and forwarding the second call to the identified forwarding network device.

20. The method of claim 19, wherein the first call comprises an Internet protocol based call.

21. The method of claim 20, wherein the second call comprises a time division multiplex based call.

22. The method of claim 19, wherein the first call includes information identifying a desired destination carrier, the method further comprising:

ignoring the desired destination carrier included with the first call.

* * * * *